United States Patent [19]

Schmidt

[11] Patent Number: 4,495,822

[45] Date of Patent: Jan. 29, 1985

[54] FLUID FLOW METER

[75] Inventor: Thomas R. Schmidt, Houston, Tex.

[73] Assignee: Shell Oil Company, Houston, Tex.

[21] Appl. No.: 452,688

[22] Filed: Dec. 23, 1982

[51] Int. Cl.³ .............................................. G01F 1/66
[52] U.S. Cl. .................................................. 73/861.27
[58] Field of Search ........... 73/861.06, 861.27, 861.28, 73/861.31

[56] References Cited

U.S. PATENT DOCUMENTS

| | | | |
|---|---|---|---|
| 2,534,712 | 12/1950 | Gray | 73/861.27 |
| 2,921,467 | 1/1960 | Hedrich et al. | 73/861.27 |
| 2,949,773 | 8/1960 | Batchelder | 73/861.27 |
| 3,845,660 | 11/1974 | McDonnell | 73/861.06 |
| 4,003,252 | 1/1977 | Dewath | 73/861.27 |
| 4,144,752 | 3/1979 | Lolk | 73/861.28 |
| 4,300,400 | 11/1981 | Bistrian, Jr. et al. | 73/861.28 |

OTHER PUBLICATIONS

Lynnworth, et al.–"Nonintrusive Ultrasonic Measurement—Flow Rate", *Flow*, vol. 1, Part Two, pp. 917–924, 1974.

Primary Examiner—Charles A. Ruehl

[57] ABSTRACT

A method of determining the velocity of a stream in a vessel comprising the steps of: providing a first quantity of ultrasonic energy to a wall of the vessel at a first predetermined location so that the first quantity of ultrasonic energy induces a first compressional wave in the stream; sensing the first compressional wave at a second predetermined location along the wall, the second location being spaced from the first location by a distance that is at least as large as the distance required for the first quantity of ultrasonic energy to induce the first compressional wave in the stream; providing a second quantity of ultrasonic energy to the wall at the second predetermined location so that the second quantity of ultrasonic energy induces a second compressional wave in the stream; sensing the second compressional wave at the first predetermined location; determining a first amount of time elapsed between the providing of the first quantity of ultrasonic energy and the sensing of the first compressional wave; and determining a second amount of time elapsed between the providing of the second quantity of ultrasonic energy and the sensing of the second compressional wave.

2 Claims, 2 Drawing Figures

FLUID FLOW METER

BACKGROUND OF THE INVENTION

This invention relates to a method of and apparatus for determining the velocity of a stream in a vessel. As used herein, stream is intended to comprise any body of flowing fluid.

Prior art clamp-on ultrasonic flow meters have been used to measure the velocity or volumetric flow rate of a liquid flowing through a pipe or other vessel. These flow meters are normally clamped onto the existing piping and do not interfere with operations since no special piping or isolation valves are needed. In these flow meters bursts of ultrasonic energy are transmitted across the pipe on a skewed path from a transmit transducer on one side of the pipe to a receive transducer on the opposite side. The ultrasonic pulses are speeded up slightly in the downstream direction by the component of flow velocity along their path and are retarded slightly when traveling in the upstream direction. By taking the difference in transit time of the sound bursts in each direction, a measure of the flow velocity is obtained. Generally, each of the two transducers can act either as a transmitter or receiver depending on the desired pulse direction. The longest transit time indicates the upstream direction and the direction of flow. These flow meters are limited to a relatively steep, short path (approximately 25 degrees off vertical) across the pipe. The vector component of flow along this path is greatly reduced because of its steep angle, and the short path reduces interaction time for flow effects to build up. Another detrimental effect of the short, steep beam employed by the prior art is that only a small portion of the flow is sampled and local disturbance can have a significant effect on the velocity sensed. In addition, the prior art ultrasonic flow meters have been limited to velocity measurements of liquids; such techniques have not been feasible in gas velocity measurements.

Therefore, it is an object of the present invention to provide a flow metering system for measuring the velocity of a fluid in a vessel or pipe by means of an extended path length to minimize the effect of local turbulence and maximize the vector component of flow of the stream.

SUMMARY OF THE INVENTION

In accordance with the present invention there is provided an apparatus for determining the velocity of a stream in a vessel comprising first and second sources of ultrasonic energy, first and second means for sensing compressional waves, and timing means. The first source means is positioned at a first predetermined location along the wall of the vessel and provides a first quantity of ultrasonic energy which induces a first compressional wave in the stream. The second source means is positioned at a second predetermined position along the wall of the vessel such that the second predetermined location is spaced from the first predetermined location by a distance that is at least as large as the distance required for the first quantity of ultrasonic energy to induce the first compressional wave in the stream. The second source means provides a second quantity of ultrasonic energy to the wall of the vessel to induce a second compressional wave in the stream. The first means for sensing the second compressional wave is positioned at the first predetermined location, and the second means for sensing the first compressional wave is positioned at the second predetermined location. Means is provided for determining a first amount of time elapsed between the providing of the first quantity of ultrasonic energy by the first source means and the sensing of the first compressional wave by the second sensing means and for determining a second amount of time elapsed between the providing of the second quantity of ultrasonic energy by the second source means and the sensing of the second compressional wave by the first sensing means.

In addition, the present invention also provides a method of determining the velocity of a stream in a vessel. A first quantity of ultrasonic energy is provided to a wall of the vessel at a first predetermined location so that the first quantity of ultrasonic energy induces a first compressional wave in the stream. The first compressional wave is sensed at a second predetermined location along the wall; the second location is spaced from the first location by a distance that is at least as large as the distance required for the first quantity of ultrasonic energy to induce the first compressional wave in the stream. A first amount of elapsed time between the providing of the first quantity of ultrasonic energy and the sensing of the first compressional wave is determined. A second quantity of ultrasonic energy is provided to the wall at the second predetermined location so that the second quantity of ultrasonic energy induces a second compressional wave in the stream. The second compressional wave is sensed at the first predetermined location, and a second amount of time that elapses between the providing of the second quantity of ultrasonic energy and the sensing of the second compressional wave is determined.

Still further, the present invention provides an apparatus for determining the velocity of a stream in a vessel comprising a first source means for providing a first quantity of ultrasonic energy to a wall of the vessel at a first predetermined location so that the first quantity of ultrasonic energy induces a first compressional wave in the stream, and a second source means for providing a second quantity of ultrasonic energy to the wall of the vessel at a second predetermined location so that the second quantity of ultrasonic energy induces a second compressional wave in the stream. A first means for sensing the first and second compressional waves is positioned at a third predetermined location along the wall. This third predetermined location is located between the first and second predetermined locations, is located closer to the first predetermined location than to the second predetermined location, and is spaced from the first predetermined location by a distance that is at least as large as the distance required for the first quantity of ultrasonic energy to induce the first compressional wave in the stream. A second means for sensing the first and second compressional waves is positioned at a fourth predetermined location along the wall of the vessel. This fourth predetermined location is located between the first and second predetermined locations, is located closer to the second predetermined location than to the first predetermined location, and is spaced from the second predetermined location by a distance that is at least as large as the distance required for the second quantity of ultrasonic energy to induce the second compressional wave in the stream. The apparatus includes means for determining a first amount of time elapsed between the sensing of the first compressional wave by the first sensing means and the sensing of the first compressional wave by the second sensing means and means for determining a second amount of time elapsed between the sensing of the second compressional wave by the second sensing means and the sensing of the second compressional wave by the first sensing means.

Still further, the present invention provides an alternative method of determining the velocity of a stream in a vessel. A first quantity of ultrasonic energy is provided to the wall of the vessel at a first predetermined location so that the first quantity of ultrasonic energy induces a first compressional wave in the stream. The first compressional wave is sensed at a second predetermined location along the wall. This second predetermined location is spaced from the first predetermined location by a distance that is at least as large as the distance required for the first quantity of ultrasonic energy to induce the first compressional in the stream. The first compressional wave is also sensed at a third predetermined location along the wall. This third predetermined location is positioned such that the second predetermined location is positioned between the first and third predetermined locations. A first amount of time that has elapsed between the sensing of the first compressional wave at the second predetermined location and the sensing of the first compressional wave at the third predetermined location is determined. A second quantity of ultrasonic energy is provided to the wall at a fourth predetermined location to induce a second compressional wave in the stream. This fourth predetermined location is spaced from the third location by a distance that is at least as large as the distance required for the second quantity of ultrasonic energy to induce the second compressional wave in the stream and is located such that the third predetermined location is located between the second and fourth predetermined locations. The second compressional wave is sensed at the third and fourth predetermined locations, and a second amount of time that has elapsed between the sensing of the second compressional wave at the third predetermined location and the sensing of the second compressional wave at the second predetermined location is determined.

In a first embodiment of the present invention piezoelectric, magnetostrictive or other electromagnetic transducers are employed at two locations along the pipe to act alternately as either an ultrasonic source or detector. The ultrasonic pulse provided to the wall of the pipelines induces a low frequency compressional wave in the fluid which travels down the fluid in the pipe. The flow velocity will either add to the basic velocity of the sound in the fluid or subtract from it depending on relative directions. Since the source and detector locations are known, differences in arrival times are caused by flow effects and can be deduced by conventional equations. The direct sound pulses that travel down the pipe walls from the source arrive sooner than the fluid path pulses and thus can be ignored by using timed gates, windows or the like in the sensing circuitry. In general, the minimal distance for the pulse of ultrasonic energy to induce a compressional wave in the fluid is approximately equal to two times the diameter of the pipe. However, the source and detector can be separated by a greater distance. Accordingly, the present invention provides an extended path length which averages out local turbulence and velocity profile disturbances within that extended path length.

In a second embodiment, the present invention employs first and second ultrasonic sources and first and second sensors for detecting the compressional waves induced by the ultrasonic energy. Both the ultrasonic sources and the compressional wave sensors can be piezoelectric, magnetostrictive or other electromagnetic transducers. The sources are positioned along the pipe at first and second locations, and the detectors are positioned between the sources at third and fourth locations. Each detector is spaced from the sources by a distance that is at least as large as the distance required for the ultrasonic energy to induce a compressional wave in the fluid in the pipe. The time elapsed between the sensing of a compressional wave by both detectors is determined for a compressional wave traveling upstream and downstream in the pipe. This embodiment utilizes a correlation meter to determine the amount of elapsed time between the sensing of a particular point on the compressional wave by correlating a point on the signal generated by the first detector with the related or corresponding point on the signal generated by the second detector.

Other objectives, advantages and applications of the present invention will be made apparent by the following detailed description of the preferred embodiments of the present invention.

DETAILED DESCRIPTION OF THE PREFERRED EMBODIMENTS

Figure 1:
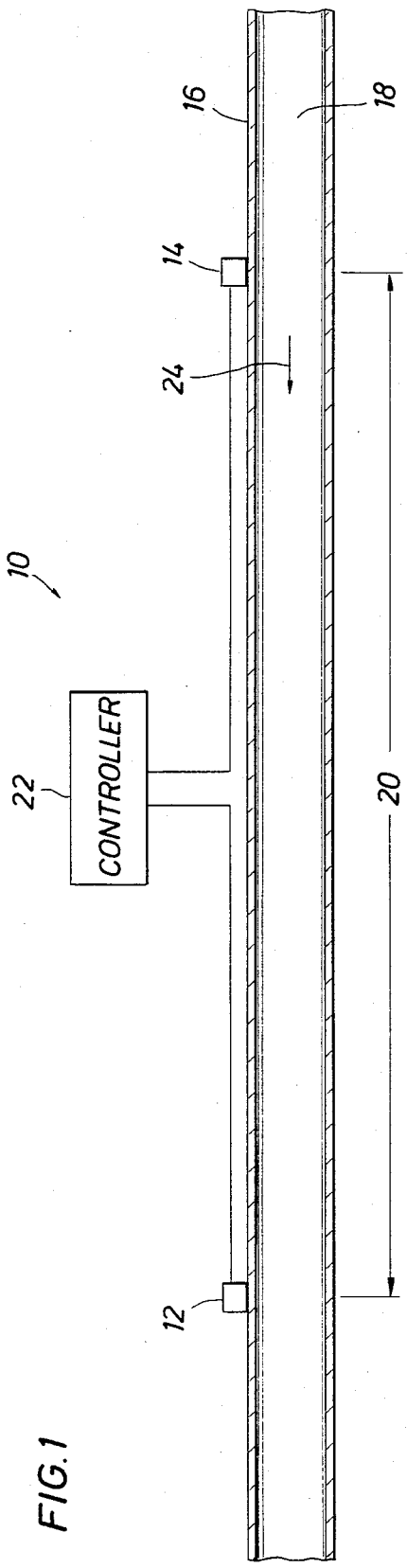
FIG. 1 is a schematic block diagram illustrating a fluid velocity detection system according to the present invention.

Referring to FIG. 1, the flow metering system of the present invention is illustrated in an embodiment for monitoring the velocity of a fluid flowing through a pipeline. The flow metering system is indicated generally by numeral 10 and has transducers 12 and 14, which can be, for example, piezoelectric, magnetostrictive, or other electromagnetic transducers, positioned on pipe 16. Transducers 12 and 14 provide pulses of ultrasonic energy to the wall of pipe 16; these pulses of ultrasonic energy induce compressional waves in fluid 18 that is flowing through pipe 16. In addition, transducers 12 and 14 sense the compressional wave created by one another. Transducers 12 and 14 are separated by distance 20 which is at least as large as the minimum distance required for the pulse of ultrasonic energy provided by transducers 12 and 14 to induce a compressional wave in fluid 18. In general, it has been found that at least a distance of approximately twice the diameter of the pipe is required for the creation of the compressional wave; however, longer distances can be used since the compressional wave can travel as far as several hundred feet from its point of origin. Transducers 12 and 14 are connected to controller 22 which provides the actuation signals to transducers 12 and 14 and determines the amount of time between the provision of a pulse of ultrasonic energy and the sensing of the compressonal wave generated thereby. Direct sound pulses down the wall of pipe 16 caused by the pulses of ultrasonic energy from one of the transducers arrives at the other transducer sooner than the compressional wave in fluid 18;

however, these can be ignored by using timed gates or windows, as is known in the art.

Assuming that the flow of fluid 18 is as indicated by arrow 24, the operation of flow metering system 10 can be described as follows. Controller 22 provides an actuation signal to transducer 12 which, in turn, provides a pulse of ultrasonic energy to the wall of pipe 16. The ultrasonic energy induces a compressional wave in fluid 18 which is sensed by transducer 14. Controller 22 determines the amount of time that has elapsed between the actuation of transducer 12 and the sensing of a compressional wave by transducer 14. Controller 22 then actuates transducer 14 causing it to provide a pulse of ultrasonic energy to the wall of pipe 16. Similarly, this pulse of ultrasonic energy creates a compressional wave in fluid 18 which is sensed by transducer 12. Again, controller 22 determines the amount of elapsed time between the actuation of transducer 14 and the sensing of the compressional wave by transducer 12. Since the positions of transducers 12 and 14 are known and fixed, the differences in the amount of elapsed time between the actuation of a transducer and the sensing of the compressional wave created thereby is caused by the flow velocity of fluid 18. Accordingly, conventional flow velocity equations can be employed to determine the flow velocity of fluid 18. The basic equations are as follows:

$$T_D = L \div (V_s + V_f) \quad (1)$$

$$T_U = L \div (V_s - V_f) \quad (2)$$

where
$T_D$ = transit time downstream
$T_U$ = transit time upstream
L = distance between the transducers
$V_s$ = velocity of sound in fluid
$V_f$ = velocity of flow With the direction of flow as shown by arrow 24 in FIG. 1, controller 22 would measure $T_U$ when transducer 12 is the source and $T_D$ when transducer 14 is the source.

Figure 2:
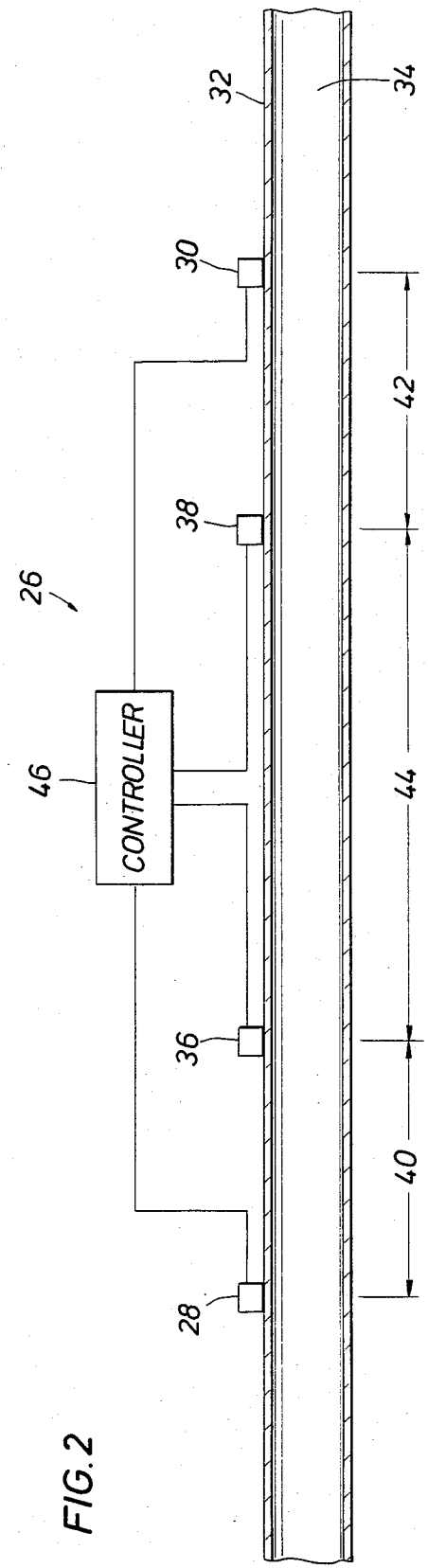
FIG. 2 is a schematic block diagram illustrating an alternative embodiment of a fluid velocity detection system according to the present invention.

Referring to FIG. 2, an alternative embodiment of the flow metering system of the present invention is indicated generally by numeral 26. Flow metering system 26 has ultrasonic energy sources 28 and 30, which can be, for example, piezoelectric, magnetostrictive or other electromagnetic transducers, positioned along pipe 32 at two predetermined locations. The ultrasonic energy generated by sources 28 and 30 induce compressional waves in fluid 34. Compressional wave detectors 36 and 38, which can be, for example, piezoelectric, magnetostrictive or other electromagnetic transducers, are positioned along pipe 32 between sources 28 and 30 such that detector 36 is closer to source 28 than detector 38 is. Detector 36 is separated from source 28 by a distance 40 which is at least as large as the distance required for the pulse of ultrasonic energy provided by source 28 to induce a compressional wave in fluid 34. Detector 38 is separated from source 30 by a distance 42 which is at least as large as the distance required for a pulse of ultrasonic energy from source 30 to create a compressional wave in fluid 34. Detectors 36 and 38 are separated by a distance 44. Sources 28 and 30 and detectors 36 and 38 are connected to controller 46 which is a correlation flow meter for determining the same point in the waveforms provided by detectors 36 and 38 in response to a compressional wave, as is known in the art.

The operation of flow metering system 26 can be described as follows. Controller 46 actuates source 28 to provide a pulse of ultrasonic energy to the wall of pipe 32, thereby inducing a compressional wave in fluid 34. This compressional wave is sensed first by detector 36 and then by detector 38. Controller 46 employs correlation techniques to determine the amount of time that has elapsed between the sensing of the compressional wave by detector 36 and detector 38. Controller 46 then actuates source 30 which provides a pulse of ultrasonic energy to the wall of pipe 32 to induce a second compressional wave in fluid 34. This second compressional wave is sensed first by detector 38 and second by detector 36, and controller 46 employs correlation techniques to determine the amount of elapsed time between the sensing of the second compressional wave by detector 38 and detector 36. After the elapsed times have been determined by controller 46, the flow velocity can be determined by utilizing equations (1) and (2) as discussed hereinabove.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. An apparatus for determining the velocity of a stream in a tubular member, said apparatus comprising: a first source means for providing a first pulse of ultrasonic energy to a wall of said tubular member at a first predetermined location so that said first pulse of ultrasonic energy induces a first compressional wave in said stream; a second source means for providing a second pulse of ultrasonic energy to said wall of said tubular member at a second predetermined location so that said second pulse of ultrasonic energy induces a second compressional wave in said stream, said second predetermined location being spaced from said first predetermined location by a distance that is at least as large as the distance required for said first pulse of ultrasonic energy to induce said first compressional wave in said stream, said distance between said first and second predetermined locations also being at least as large as a distance equal to two times the diameter of said tubular member; a first means for sensing said second compressional wave at said first predetermined location; a second means for sensing said first compressional wave at said second predetermined location, said first source means and said first sensing means comprising the same first piezoelectric transducer and said second source means and said second sensing means comprising the same second piezoelectric transducer, said first and second transducers being positioned on the same side of said tubular member; controller means for determining a first amount of time elapsed between the providing of said first pulse of ultrasonic energy by said first source means and the sensing of said first compressional wave by said second sensing means, for determining a second amount of time elapsed between the providing of said second pulse of ultrasonic energy by said second source means and the sensing of said second compressional wave by said first sensing means and for determining the flow velocity of the stream in the tubular member in accordance with the following equation:

$$T_D = L \div (V_s + V_f)$$

$$T_U = L \div (V_s - V_f)$$

wherein $T_D$ = transit time downstream
$T_U$ = transit time upstream
L = distance between the transducers
$V_s$ = velocity of sound in fluid comprising the stream
$V_f$ = velocity of flow.

2. An apparatus for determining the velocity of a stream in a tubular member, said apparatus comprising: a first source means for providing a first pulse of ultrasonic energy to a wall of said tubular member at a first predetermined location so that said first pulse of ultrasonic energy induces a first compressional wave in said stream; a second source means for providing a second pulse of ultrasonic energy to said wall of said tubular member at a second predetermined location so that said second pulse of ultrasonic energy induces a second compressional wave in said stream; a first means positioned at a third predetermined location along said wall for sensing said first and second compressional waves, said third predetermined location being located between said first and second predetermined locations, being located closer to said first predetermined location than to second predetermined location, and being spaced from said first predetermined location by a distance that is at least as large as the distance required for said first pulse of ultrasonic energy to induce said first compressional wave; a second means positioned at a fourth predetermined location along said wall for sensing said first and second compressional waves, said fourth predetermined location being located between said first and second predetermined locations, being located closer to said second predetermined location than to said first predetermined location, and being spaced from said second predetermined location by a distance that is at least as large as the distance required for said second pulse of ultrasonic energy to induce said second compressional wave in said stream, said first predetermined location also being spaced from said third predetermined location and said second predetermined location being spaced from said fourth predetermined location by a distance that is at least as large as a distance equal to two times the diameter of said tubular member, said first and second source means and said first and second sensing means comprising piezoelectric transducers which are located on the same side of the tubular member; controller means for determining a first amount of time elapsed between the sensing of said first compressional wave by said first sensing means and the sensing of said first compressional wave by said second sensing means, for determining a second amount of time elapsed between the sensing of said second compressional wave by said second sensing means and the sensing of said second compressional wave by said first sensing means, and for determining flow velocity of the stream in the tubular member in accordance with the following equation:

$$T_D = L \div (V_s + V_f)$$

$$T_U = L \div (V_s - V_f)$$

wherein $T_D$ = transit time downstream
$T_U$ = transit time upstream
L = distance between the first and second sensing means
$V_s$ = velocity of sound in fluid comprising the stream
$V_f$ = velocity of flow.

* * * * *